United States Patent [19]
Patry

[11] Patent Number: 4,768,579
[45] Date of Patent: Sep. 6, 1988

[54] RECIPIENT DESIGN TO CONTAIN AN ENERGY STORAGE MEDIUM WITH HIGH FUSION-CRYSTALLIZATION LATENT HEAT

[76] Inventor: Jean Patry, 9, Rue Saint-Paul, Paris, France, 75004

[21] Appl. No.: 89,776

[22] Filed: Aug. 27, 1987

[30] Foreign Application Priority Data

Jan. 13, 1987 [FR] France ................ 87 00270

[51] Int. Cl.⁴ ............................ F28D 20/00
[52] U.S. Cl. ........................ 165/10; 165/81; 126/400
[58] Field of Search ............ 165/10, 81; 62/530, 62/529; 126/400

[56] References Cited

U.S. PATENT DOCUMENTS

| | | | |
|---|---|---|---|
| 2,525,261 | 10/1950 | Henderson | 221/175 |
| 4,205,656 | 6/1980 | Scarlata | 126/400 |
| 4,211,208 | 7/1980 | Lindner | 165/10 |
| 4,393,918 | 7/1983 | Patry | 165/10 |

FOREIGN PATENT DOCUMENTS

| | | | |
|---|---|---|---|
| 0118720 | 9/1984 | European Pat. Off. | |
| 2552698 | 6/1977 | Fed. Rep. of Germany . | |
| 3005450 | 8/1981 | Fed. Rep. of Germany | 165/10 |
| 3102729 | 9/1982 | Fed. Rep. of Germany . | |
| 3139863 | 10/1983 | Fed. Rep. of Germany . | |
| 1104404 | 11/1955 | France . | |
| 2469678 | 2/1984 | France . | |
| 104092 | 6/1984 | Japan | 165/10 |

*Primary Examiner*—Albert W. Davis, Jr.
*Attorney, Agent, or Firm*—Dowell & Dowell

[57] ABSTRACT

A recipient which is filled with a storage medium which expands during phase transformation wherein the recipient is a flexible structure having a geometrical shape such that only the flexibility of the structure is required to increase its volume to compensate for the expansion of the stored medium without creating stress or stretching the walls of the structure.

7 Claims, 1 Drawing Sheet

RECIPIENT DESIGN TO CONTAIN AN ENERGY STORAGE MEDIUM WITH HIGH FUSION-CRYSTALLIZATION LATENT HEAT

BACKGROUND OF THE INVENTION

1. Field of the Invention

This invention relates to a recipient designed in such a way as to contain a cooling or heating energy storage medium with high latent heat of fusion, and used in energy storage installations.

2. History of the Related Art

Installations requiring the use of variable quantities of heat or refrigeration production over a given period are already known, these installations being designed in such a way as to considerably reduce the capacity of the machines used to produce the heating and/or refrigeration. An example of such a system is described, in particular, in French Pat. No. 79 28 315, filed by Mr. Jean Patry on the 16th of Nov. 1979, for Improvements to Refrigeration Systems (Perfectionnements apportes aux installations "frigorifiques").

In such installations, storage systems are used for the heating and cooling which are produced, then redistributed according to requirements, the storage capacity having been chosen so that the installation may instantaneously supply the maximum capacity demanded by the loads of the installation.

Numerous recipients for installations designed for storing heating or cooling energy are known as well, these recipients containing a phase changing material.

After careful studying of earlier documents covering the state of the above mentioned technique, one can deduce that three types of recipients for phase changing materials exist which are:

(a) a recipient preferably completely filled with the storage medium and having a flexible structure to absorb the variations in volume following a change in volume of the storage medium during its phase changing.

Such an example is described in U.S. Pat. No. 2,525,261.

(b) a recipient preferably completely filled with the storage medium and having an elastic structure to absorb the variations in volume following a change in volume of the storage medium during a phase transformation of the latter.

An example of such a recipient is shown in FR Pat. No. 1,104,404.

(c) a recipient partly filled with the storage medium, and which generally has a rigid structure; the free gas or air space serves, through compression, to absorb the increase in volume due to the change in volume of the storage medium during its phase transformation.

One can find a description of this recipient in U.S. Pat. No. 4,205,656.

In all instances, the aim is to encapsulate a substance which changes phases (water, saline hydrate, paraffin, etc.) within a shell for the storage of heat or cooling energy through the use of the latent heat of fusion.

Due to its symmetrical qualities, a spherical shape for the shell containing the substance which changes phases is by far the most often used.

In addition, bulk loading of these spherical capsules into a tank is simple to achieve, gives a good filling ration for the tank and proper circulation of the coolant effecting the heat transfer.

The thermal qualities of this type of storage are measured by the exchange capacity between the substance which changes phases and the coolant surrounding the capsule.

For a given substance which changes phases and a given temperature difference between the substance which changes phases and the coolant, the exchange capacity is:

proportional to the thermal conductivity of the materials used $\lambda$.

inversely proportional to the thickness of the shells or the materials to be crossed $e$.

proportional to the heat exchanging surface between the substance which changes phases and the coolant $S$.

$$P = f(\lambda \cdot 1/e \cdot S)$$

The technical and economic goal consists of finding the best compromise ($\lambda$, $1/e$, $S$) at the best cost.

Certain known solutions concerned the thermal conductivity of the materials used in the manufacture of the sphere but, if steel has good thermal conductivity, its cost is high; when a plastic substance is used, thermal conductivity is low and so is the cost price; and, when a compromise consisting of a plastic substance with incorporated metallic particles is used, average thermal conductivity is obtained at a higher price.

Other solutions have consisted in making shells with hollows imprinted on all or part of the sphere to reduce the thickness $e$ to be crossed in order to increase the crystallization speed of the phase substance which changes phases.

There again, difficulties were encountered because the base of the hollow imprints stretch when deformed and become thinner and cause splitting zones and deterioration of the shells.

There are also spheres with an air pocket to absorb expansion of the substance which changes phases without bursting the shell but there again the efficiency is lower due to the air pocket and the increased thickness of the shell which must be rigid.

None of the previous solutions have therefore given satisfaction.

SUMMARY OF THE INVENTION

It is for this reason that the present invention tends to define a recipient, preferably completely filled with the storage medium and having a thin and flexible structure to absorb the variations in volume following a change in volume of the storage medium during its phase transformation.

As a consequence, the present invention proposes a recipient with a flexible structure with a geometrical shape such that only its flexibility is required to increase its volume.

One can understand that this is essential and determining in the obtaining of a quality production, in particular when the shell is made of plastic. It is effectively known that, when subjected to stretching, the molecules forming plastics spread out accordingly and enable transfer by osmosis or by difference in concentration. It is also known that the modulus of elasticity of plastics is low and that an increase in the internal pressure of the shell caused by the increase in volume of the storage medium can result in the exceeding of the limit of elasticity of the material composing the shell preferably in the least resistant place, which would cause rapid deterioration of the shell.

BRIEF DESCRIPTION OF THE DRAWINGS

A form of construction of the object of the invention is shown, as a non-restrictive example, in the attached drawings.

DESCRIPTION OF THE PREFERRED EMBODIMENT

Diverse other characteristics of the invention appear in the following detailed description.

Figure 1:
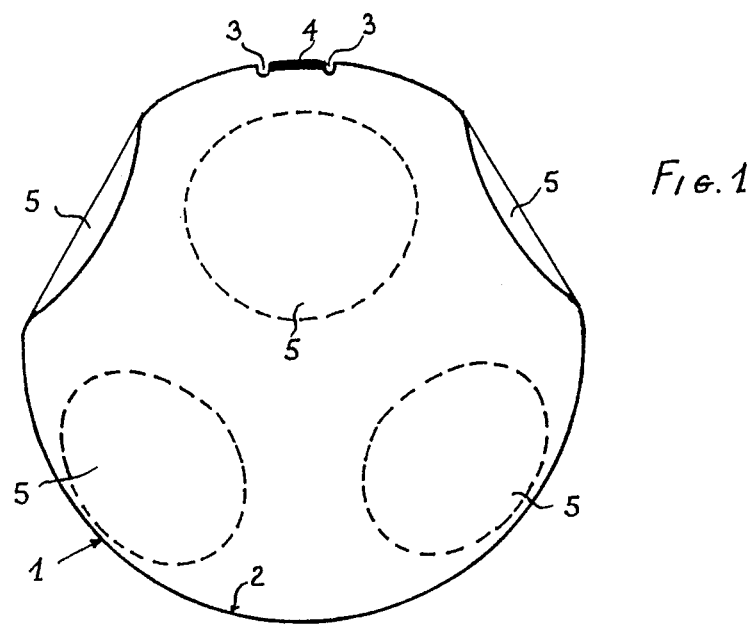
FIG. 1 is a diametrical cross-section of the recipient containing the substance which changes phases.
Figure 2:
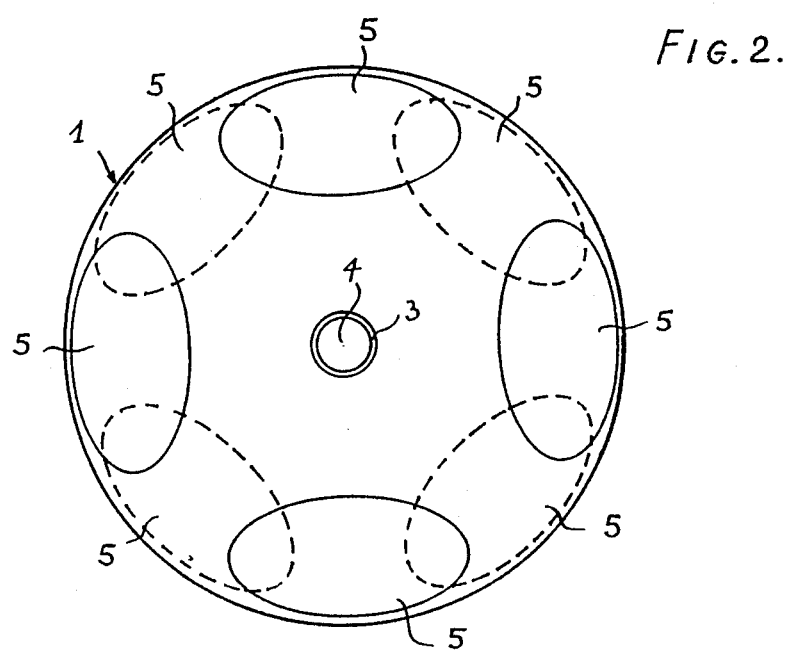
FIG. 2 is an external view of the recipient shown at 90° in relation to FIG. 1.

In FIG. 1 is shown a recipient or shell of practically spherical shape and with thin walls (2) of even thickness with, in its spherical region, a circular valve (3) which is hermetically sealed, after filling with the substance which changes phases, with a cap (4).

In addition, the shell (1) comprises hollows (5) which are inverted circular spherical domes the radius of concave curvature of which is equal to the radius of convex curvature of the wall of the sphere forming the shell (1). In general, eight hollows (5) are provided for on the outside of the sphere forming the shell (1), these hollows being situated at 120° or 90° in relation to each other in the horizontal plane passing through the center of the sphere and offset by 45° in relation to each other in the vertical plane passing through the center of the sphere.

The volume represented by the imprinted hollows in relation to the volume of the perfect sphere is at least equal to the increase in volume of the storage medium during its phase transformation.

Thus, when the storage medium changes phases, the increase in internal pressure due to this change acts upon the spherical hollows (5) which are gradually turned inside-out, freeing the volume necessary for expansion.

One can clearly see in the form of construction shown that it is the flexibility of the wall alone which is used to obtain an increase in volume and that the substance of which the shell is constructed is never stretched nor subjected to stress.

An increase in the number of hollow spherical domes imprinted in the shell (1) of the sphere has the effect of:

(a) proportionally reducing the amount of flexion required;

(b) better spreading the increase in volume over the surface of the shell.

Thus, the greater the number of hollows, the better the quality of the product.

As already stated above, the heat or cooling energy storage medium may be water, a saline hydrate, paraffin, etc., which is put in the spherical shell (1) in a liquid state. As soon as filling is finished, the cap (4) is fitted, tightly sealing the spherical shell.

I claim:

1. Recipient designed to contain an energy storage medium having fusion-crystallization latent heat characteristics, such as water, for use in a storage installation including an enclosure in which a plurality of said recipients are stacked, each recipient having a first internal volume which is totally filled with the storage medium and comprising
    (a) an outer shell which is formed of a flexible material and which is defined by a given surface area,
    (b) at least one concave hollow formed in said outer shell,
    (c) said concave hollow being inverted to a convex configuration along a single axis of inversion taken radially through said concave hollow and the recipient as the storage medium expands therein due to a phase transformation, and
    (d) said concave hollow being inverted so that the inner volume of the recipient continuously corresponds to an identical increase in the volume of the storage medium.

2. Recipient according to claim 1, characterized inasmuch as the increase in internal volume of said outer shell caused by the inversion of the concave hollow occurs without any stretching or compression of the material of which the shell is constructed.

3. Recipient according to one of claim 2, characterized inasmuch as the internal volume of said outer shell is increased as said concave hollow is inverted without said surface area of the shell.

4. Recipient according to claim 3, characterized inasmuch as said outer shell defines a sphere having a first radius of curvature, said sphere having a plurality of said concave hollows formed therein when the storage medium is in a liquid state, said hollows having radii of curvature which are equal to the radius of curvature of said sphere but are inverted, said hollows defining a total volume in relation to the said sphere so as to be inverted to present the form of a nearly perfect sphere when the storage medium is totally crystallized.

5. Recipient according to claim 1, characterized inasmuch as said outer shell defines a sphere having a first radius of curvature, said sphere having a plurality of said concave hollows formed therein when the storage medium is in a liquid state, said hollows having radii of curvature which are equal to the radius of curvature of said sphere but are inverted, said hollows defining a total volume in relation to the said sphere so as to be inverted to present the form of a nearly perfect sphere when the storage medium is totally crystallized.

6. Recipient according to claim 2, characterized inasmuch as said outer shell defines a sphere having a first radius of curvature, said sphere having a plurality of said concave hollows formed therein when the storage medium is in a liquid state, said hollows having radii of curvature which are equal to the radius of curvature of said sphere but are inverted, said hollows defining a total volume in relation to the said sphere so as to be inverted to present the form of a nearly perfect sphere when the storage medium is totally crystallized.

7. Recipient according to claim 1, characterized inasmuch as the internal volume of said outer shell is increased as said concave hollow is inverted without increasing said surface area of said outer shell.

* * * * *